R. B. FAGEOL.
VEHICLE.
APPLICATION FILED JAN. 3, 1916.
1,226,959.
Patented May 22, 1917.
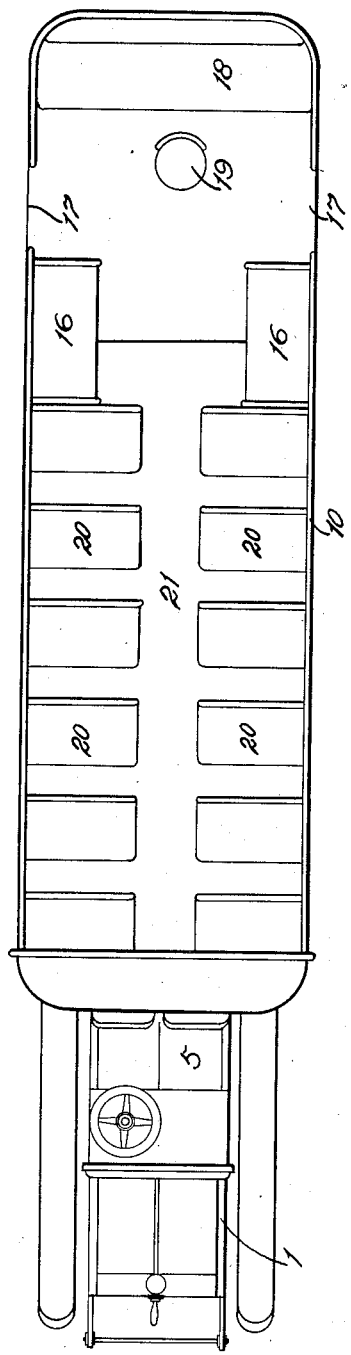
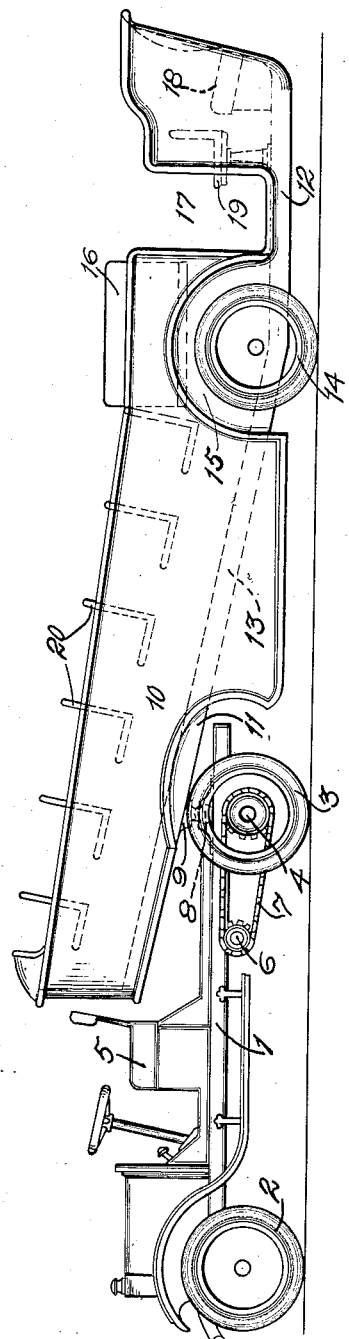
WITNESS
Wm. F. Drew
INVENTOR.
Rollie B. Fageol
BY
Cecsen & Totten
ATTORNEYS.

UNITED STATES PATENT OFFICE.

ROLLIE B. FAGEOL, OF OAKLAND, CALIFORNIA.

VEHICLE.

1,226,959.  Specification of Letters Patent.  Patented May 22, 1917.

Application filed January 3, 1916.  Serial No. 69,936.

*To all whom it may concern:*

Be it known that I, ROLLIE B. FAGEOL, a citizen of the United States, residing at Oakland, in the county of Alameda and State of California, have invented certain new and useful Improvements in Vehicles, of which the following is a specification.

The present invention relates to improvements in vehicles particularly designed for the carrying of passengers, and has for its principal objects to provide a vehicle consisting of a motor car on which pivotally rests one end of a passenger carrying car or vehicle supported by a single pair of supporting wheels positioned adjacent its opposite end; to provide a passenger carrying car or vehicle having entrance and exit passages adjacent one end and in proximity to the ground surface, enabling passengers to easily board and alight from the vehicle with but a single step; to provide a two wheeled vehicle having a large carrying capacity, and which may be attached to and supported at one end by any suitable motor car.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction may be resorted to without departing from the spirit or sacrificing any of the advantages of the invention.

To more fully comprehend the invention, reference is directed to the several views of the drawings, disclosing the preferred embodiment thereof, and in which—

Figure 1 is a view in plan, disclosing the motor car and the passenger carrying car or vehicle, and the arrangement of the seats and aisles therein.

Fig. 2 is a view in side elevation, disclosing more fully the construction of the passenger carrying car or vehicle, the motor vehicle, the supporting connection between the free end of the passenger carrying vehicle and the motor vehicle.

In the several views of the drawings wherein like characters of reference designate corresponding parts,—1 indicates a suitable motor vehicle frame, preferably that of the truck type, which is capable of supporting heavy loads, and the same is supported by the pivoted front steering wheels 2 and rear drive wheels 3 mounted on the rear axle 4. The frame 1 mounts an operator's seat 5 in advance of the rear end thereof, and also mounts the jack shaft 6 driven by a motor, not shown, and the rotation of said shaft drives the operating chains 7 which coöperate with the drive wheels 3 and propel the vehicle.

On the rear portion of the vehicle frame 1, preferably positioned over the axle 4, is a socket or receiving member 8 in which is adapted to be received a ball member 9 extending beneath the forward free end of a passenger carrying vehicle 10.

The passenger carrying vehicle 10 is formed with a supporting frame 11 which has a substantially horizontal portion 12 at the rear thereof, and which normally lies parallel with the road surface and is also provided with an upwardly inclined front portion 13 connecting therewith, and a portion of which projects over the rear of the motor vehicle frame 1. Suitable supporting wheels 14 are provided for the passenger carrying vehicle adjacent the juncture of the portions 12 and 13 of the frame 11 thereof, and the same support the rear end thereof, the front end resting on and supported by the rear portion of the motor vehicle frame 1.

The substantially horizontal portion 13 provides an entrance and exit platform close to the ground surface and preferably of such distance therefrom as to be boarded by a single step from the ground, and the upwardly inclined portion 13 provides an easy access to the passenger carrying seats carried by that portion of the frame, and also dispenses with the necessity of steps.

The supporting wheels 14 are received in suitable pockets or undercut portions 15 in the sides of the vehicle 10 and over said portions 15 are provided the passenger carrying seats 16. Suitable entrance and exit passages 17 are provided at opposite sides of the vehicle 10 in rear of the wheels 14 thereof to permit the boarding of the vehicle from either side, and extending across the rear of the vehicle in rear of the passages 17 is a suitable seat 18 in front of which is preferably positioned the conductor's seat 19. Transversely extending seats 20 are provided on the inclined portion 13 of the vehicle and the same are separated by a longitudinally extending aisle 21.

It is to be understood that the seats for the vehicle 10 may be arranged in any suitable manner, just so long as entrance and exit passages are provided adjacent to the horizontal portion 12 of the vehicle.

By my improved construction the load of the passenger carrying vehicle is distributed between the wheels 14 thereof and the motor vehicle, and the pivotal supporting connection between the motor and passenger carrying vehicles enables the steering of the motor vehicle and insures the following or trailing of the passenger carrying vehicle.

By my improved construction I am enabled to employ a motor member of light weight and little power, and thereby propel or draw a load greatly in excess of that capable of being supported solely by the motor member, thereby dispensing with the heavy and powerful vehicles required to support the body of the commonly termed sight seeing vehicles.

Having thus described my invention, what I claim as new and desire to protect by Letters Patent is:—

1. A vehicle train comprising a motor car having front and rear supporting wheels and capable of being steered in any desired direction, a passenger carrying vehicle provided adjacent one end with a pair of supporting wheels and at its opposite end overhanging and resting on the motor vehicle, a pivotal supporting connection between the motor vehicle and the end of said passenger carrying vehicle, the portion of said passenger carrying vehicle in rear of said supporting wheels being provided at one side with an entrance opening and being disposed substantially parallel with the road surface and in close proximity therewith, and the portion thereof in advance of said supporting wheels and overhanging said motor car being upwardly inclined.

2. A vehicle for the carrying of passengers, comprising a motor member having front and rear supporting wheels and capable of being steered in any direction, a passenger carrying member having a plurality of passenger carrying seats and provided adjacent one end with a pair of supporting wheels, and at its opposite end inclined upwardly, overhanging and resting on the motor member, a pivotal supporting connection between the motor and passenger carrying members, the portion of said passenger carrying vehicle in rear of said supporting wheels being disposed substantially parallel with the road surface and in close proximity thereto, and provided in one side with a passage for the entrance and exit of passengers and provided in rear of said passage and across the rear of said vehicle with a passenger carrying seat.

In testimony whereof I have signed my name to this specification in the presence of two subscribing witnesses.

ROLLIE B. FAGEOL.

Witnesses:
HARRY A. TOTTEN,
D. B. RICHARDS.